US009942148B1

(12) United States Patent
Sivaramakrishnan et al.

(10) Patent No.: US 9,942,148 B1
(45) Date of Patent: *Apr. 10, 2018

(54) TUNNELED PACKET AGGREGATION FOR VIRTUAL NETWORKS

(71) Applicant: Juniper Networks, Inc., Sunnyvale, CA (US)

(72) Inventors: Rajagopalan Sivaramakrishnan, Sunnyvale, CA (US); Anand H Krishnan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,156

(22) Filed: Feb. 13, 2017

Related U.S. Application Data

(63) Continuation of application No. 14/226,509, filed on Mar. 26, 2014, now Pat. No. 9,571,394.

(Continued)

(51) Int. Cl.
*H04W 4/00* (2009.01)
*H04L 12/743* (2013.01)
(Continued)

(52) U.S. Cl.
CPC .......... *H04L 45/7453* (2013.01); *H04L 45/50* (2013.01); *H04L 45/586* (2013.01)

(58) Field of Classification Search
CPC ............. H04L 12/4633; H04L 12/4641; H04L 2212/00; H04L 45/74; H04L 69/22; H04L 69/324
(Continued)

(56) References Cited

U.S. PATENT DOCUMENTS 6,937,574 B1   8/2005   Delaney et al.
7,136,377 B1 * 11/2006   Tweedly ............. H04L 12/4633
                                                       370/356
(Continued)

FOREIGN PATENT DOCUMENTS

WO        2013184846 A1    12/2013

OTHER PUBLICATIONS

Corbet, "JLS2009: Generic Receive Offload," Oct. 27, 2009, 3 pp., retrieved http://lwn.net/Articles/358910/.
(Continued)

*Primary Examiner* — Asad Nawaz
*Assistant Examiner* — Berhanu Belete
(74) *Attorney, Agent, or Firm* — Shumaker & Sieffert, P.A.

(57) ABSTRACT

In general, techniques are described for enhancing operations of virtual networks. In some examples, a network system includes a plurality of servers interconnected by a switch fabric comprising a plurality of switches interconnected to form a physical network. Each of the servers comprises an operating environment executing one or more virtual machines in communication via one or more virtual networks. The servers comprise a set of virtual routers configured to extend the virtual networks to the operating environments of the virtual machines. A virtual router of the set of virtual routers is configured to aggregate a plurality of inbound tunnel packets according to a same virtual network identifier in order to generate an aggregate tunnel packet. The virtual router is further configured to route the aggregate tunnel packet to a host associated with a virtual network identified by the same virtual network identifier.

18 Claims, 12 Drawing Sheets

Related U.S. Application Data

(60) Provisional application No. 61/926,079, filed on Jan. 10, 2014.

(51) Int. Cl.
   *H04L 12/713* (2013.01)
   *H04L 12/723* (2013.01)

(58) Field of Classification Search
   USPC .......................................................... 370/392
   See application file for complete search history.

(56) References Cited

U.S. PATENT DOCUMENTS

| | | |
|---|---|---|
| 7,184,437 B1 | 2/2007 | Cole et al. |
| 7,225,259 B2 | 5/2007 | Ho et al. |
| 9,356,866 B1 | 5/2016 | Sivaramakrishnan et al. |
| 9,473,394 B1 | 10/2016 | Sivaramakrishnan et al. |
| 9,571,394 B1 | 2/2017 | Sivaramakrishnan et al. |
| 9,674,088 B1* | 6/2017 | Sivaramakrishnan ...... H04L 45/7453 |
| 2002/0062344 A1 | 5/2002 | Ylonen et al. |
| 2002/0138628 A1 | 9/2002 | Tingley et al. |
| 2003/0174706 A1 | 9/2003 | Shankar et al. |
| 2003/0177221 A1 | 9/2003 | Ould-Brahim et al. |
| 2004/0001508 A1* | 1/2004 | Zheng .................. H04L 12/4633 370/466 |
| 2004/0123139 A1* | 6/2004 | Aiello .................. H04L 63/0227 713/154 |
| 2004/0158710 A1* | 8/2004 | Buer ..................... H04L 63/0485 713/160 |
| 2005/0220014 A1 | 10/2005 | DelRegno et al. |
| 2005/0220059 A1 | 10/2005 | DelRegno et al. |
| 2005/0220107 A1 | 10/2005 | DelRegno et al. |
| 2007/0036178 A1 | 2/2007 | Hares et al. |
| 2009/0034557 A1 | 2/2009 | Fluhrer et al. |
| 2009/0041038 A1* | 2/2009 | Martini .................. H04L 45/50 370/401 |
| 2009/0092043 A1 | 4/2009 | Lapuh et al. |
| 2009/0183057 A1 | 7/2009 | Aizman |
| 2009/0296613 A1* | 12/2009 | Kahn ...................... H04L 47/10 370/310 |
| 2010/0046512 A1* | 2/2010 | Xia ...................... H04L 12/4633 370/389 |
| 2010/0217971 A1* | 8/2010 | Radhakrishnan ... H04L 63/0272 713/153 |
| 2010/0228974 A1 | 9/2010 | Walls et al. |
| 2010/0246388 A1 | 9/2010 | Gupta et al. |
| 2010/0287548 A1 | 11/2010 | Zhou et al. |
| 2010/0309881 A1 | 12/2010 | Kim et al. |
| 2010/0322239 A1 | 12/2010 | Li et al. |
| 2011/0013557 A1* | 1/2011 | Westberg ............ H04L 12/4633 370/328 |
| 2011/0235545 A1 | 9/2011 | Subramanian et al. |
| 2012/0066389 A1* | 3/2012 | Hegde .................. G06F 9/4856 709/226 |
| 2012/0099602 A1* | 4/2012 | Nagapudi ........... H04L 12/4633 370/401 |
| 2012/0185563 A1 | 7/2012 | Sugiyama et al. |
| 2012/0246637 A1 | 9/2012 | Kreeger et al. |
| 2012/0281700 A1 | 11/2012 | Koganti et al. |
| 2013/0163594 A1 | 6/2013 | Sharma et al. |
| 2013/0250951 A1 | 9/2013 | Koganti |
| 2013/0318345 A1 | 11/2013 | Hengeveld |
| 2014/0185616 A1 | 7/2014 | Bloch et al. |
| 2014/0215560 A1 | 7/2014 | Roberson |
| 2014/0226646 A1 | 8/2014 | Nishigori et al. |
| 2014/0269712 A1* | 9/2014 | Kidambi ............. H04L 12/4633 370/392 |
| 2014/0280857 A1 | 9/2014 | Yang et al. |
| 2014/0344326 A1 | 11/2014 | Kamath et al. |
| 2015/0006946 A1 | 1/2015 | Littlefield et al. |
| 2015/0009995 A1* | 1/2015 | Gross, IV .............. H04L 45/74 370/392 |
| 2015/0081863 A1* | 3/2015 | Garg ...................... H04L 41/00 709/223 |
| 2015/0117256 A1 | 4/2015 | Sabaa et al. |
| 2015/0117454 A1 | 4/2015 | Koponen et al. |
| 2015/0124822 A1 | 5/2015 | Chu et al. |
| 2015/0180773 A1 | 6/2015 | DeCusatis et al. |
| 2015/0195178 A1 | 7/2015 | Bhattacharya et al. |
| 2015/0278148 A1* | 10/2015 | Sindhu ................ G06F 13/4081 710/302 |
| 2015/0280939 A1* | 10/2015 | Sindhu ................ H04L 12/4641 370/236 |
| 2016/0248670 A1* | 8/2016 | Gross, IV .............. H04L 45/74 |

OTHER PUBLICATIONS

Corbet, "Large Receive Offload," Aug. 1, 2007, 3 pp., retrieved from http://lwn.net/Articles/243949/.

Knight et al., "Network based IP VPN Architecture using Virtual Routers," Provider Provisioned VPN WG Internet Draft, draft-ieft-ppvpn-vpn-vr-03.txt, Jul. 2002, 19 pp.

U.S. Appl. No. 15/156,259, by Juniper Networks, Inc. (Inventors: Sivaramakrishnan et al.), filed May 16, 2016.

Prosecution History from U.S. Appl. No. 15/156,259, dated Aug. 31, 2016 through Feb. 13, 2017, 35 pp.

Hopps, "Analysis of an Equal-Cost Multi-Path Algorithm," Network Working Group, RFC 2992, Nov. 2000, 8pp.

"White Paper—Contrail Architecture," Juniper Networks, Inc., Oct. 1, 2013, 44 pp.

Sivaramakrishnan, "Contrail VRouter," Juniper Networks, Inc., Sep. 17, 2013, 16 pp.

DaveM, "Hacking and Other Thoughts—How GRO Works," DaveM's Linux Networking BLOG, Aug. 30, 2010, 1 pp.

Sivaramakrishnan, "Evaluating OpenContrail Virtual Router Performance," GitHub: OpenContrail Blog, Oct. 16, 2013, 3 pp.

\* cited by examiner

TUNNELED PACKET AGGREGATION FOR VIRTUAL NETWORKS

PRIORITY CLAIM

This application is a continuation of U.S. application Ser. No. 14/226,509 filed Mar. 26, 2014, which claims the benefit of U.S. Provisional Application No. 61/926,079, filed Jan. 10, 2014, the entire contents of each of which are incorporated herein by reference.

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described for enhancing operations of virtual networks. For example, a virtual network controller is described that configures and manages an overlay network within a physical network formed by plurality of switches. A plurality of servers is interconnected by the switch fabric, and each of the servers provides an operating environment executing one or more virtual machines in communication via the overlay networks. A set of virtual routers operating within the servers and/or other devices of the physical network extends the overlay network as a virtual network to the operating environment of the virtual machines. The controller may instruct the servers and the virtual routers to perform various operations, such as forwarding traffic through the overlay networks; re-routing traffic in the virtual networks due to network events; replicating traffic for multicasting, networking services including security, NAT, mirroring, and load balancing; providing multi-tenant services to support multiple virtual networks; monitoring and logging traffic characteristics within the virtual networks; and other operations.

The techniques described herein may be utilized to enhance, for example, operation of the virtual routers or other devices that provide virtual networks. In general, a virtual router for a virtual network executes multiple routing instances for corresponding virtual networks. Each virtual network interconnects multiple virtual routers collectively implementing the virtual network. Packets received by the virtual router from the underlying physical network fabric may include an outer header to allow the physical network fabric to tunnel the payload or "inner packet" to a physical network address for a network interface of the server that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In one example of enhancing the operation of the virtual routers, a virtual router may, as described herein, buffer and aggregate multiple tunneled packets received from the underlying physical network fabric prior to delivery to the appropriate routing instance for the packets. In some examples, the virtual router aggregates multiple packets according to matching criteria that includes the virtual network identifier of the outer header as well as one or more fields of the inner header. The virtual router may in some cases extend a kernel-based offload engine that seamlessly and automatically aggregates multiple incoming packets from a single packet flow. For example, the virtual router may extend a Generic Receive Offload (GRO) or Large Receive Offload (LRO) routines available by the server kernel and that is specialized for processing layer two (L2) packets, but the virtual router may leverage the GRO routine in a way so as to utilize the routine to aggregate and manipulate multiple tunneled packets as if they were L2 packets. In some examples, the virtual router provides multiple tunneled packets to GRO for aggregation by in part setting the respective virtual network identifiers and invoking the GRO routine as if the virtual network identifiers are a L2 destination address for the inner packets of the tunneled packets. In this way, the GRO routine considers each packet received from the virtual router for aggregation purposes as a non-tunneled, layer 2 packet that includes at least a L2 destination address (e.g., a destination MAC address) set to the virtual network identifier for a received tunneled packet and a layer 3 ("network") packet that corresponds to the inner packet for the received tunneled packet. By matching according to at least L2 ("data link") destination address and one or more header fields of the layer 3 packet, the GRO routine may aggregate multiple by merging such packets into a single, aggregate packet for delivery to the appropriate routing instance. In this way, the aggregation techniques may increase the virtual router bandwidth by reducing the number of packet headers for processing and concomitantly reducing the amount of network stack traversal needed to process multiple received packets.

In another example of enhancing the operation of the virtual routers, techniques are described for steering received packets among multiple processor cores to facilitate packet processing load balancing among the cores. For instance, a particular network interface card of a server that executes a virtual router may be associated with a designated processor core to which the network interface card directs all received packets. The designated processor core, rather than processing each of the received packets, offloads flows to one or more other processor cores for processing to take advantage of available work cycles of the other processor cores. In some cases, the designated processor core applies a hash function to an inner header of each received packet to determine a corresponding hash value that maps to one of the processor cores of the server and directs the received packet to the mapped processor core for processing. In some cases, the processor cores of the server progressively and separately apply a hash function to both the outer and inner headers of received packets. For instance, for a received packet, the designated processor core may apply the hash function to the outer header of the received packet to identify a processor core of the server with which to apply a hash function to the inner header of the received packet. The identified processor core may then partially process the received packet by first applying a hash function to the inner header of the received packet to identify a processor core with which to process the received packet. The identified processor core with which to process the received packet for the server may then process the received packet. In this way, various packet flows received by the server may distribute incoming packet flows among multiple processing cores of the server to use more than the processing core designated for the network interface card. Receive packet steering may be enabled in this way on a per-interface basis.

In another example of enhancing the operation of the virtual routers, techniques are described for proactively adding, by the virtual router, flow table entries to identify reverse flows of flows processed by a routing instance of the virtual router. Each flow traversing a routing instance of the virtual router in either the inbound (received from the underlying physical network) or outbound direction (for transmission to the underlying physical network) may be identified according to an n-tuple of the flow, such as a combination of source and destination network address or the conventional 5-tuple including the source and destination network address, source and destination port, and protocol.

The virtual router, upon receiving a packet for a packet flow that does not include a flow table entry in a flow table that would otherwise enable the virtual router to apply fast-path processing to the packet, instead applies slow-path processing to determine a forwarding policy for the packet flow and add an entry to the forwarding table to associate the flow with the forwarding policy for subsequent fast-path operations for subsequent packets for the flow and received by the virtual router. In addition, the virtual router proactively adds an entry to the forwarding table to associate with reverse packet flow for the packet flow with a forwarding policy for the reverse packet flow, despite not yet receiving a packet for the reverse packet flow for the packet flow. A reverse packet flow for a packet flow may be identified using the same header fields as that used to identify the packet flow. However, the reverse packet flow includes mirrored values for symmetric fields of the packet header. For example, a packet flow identified by the combination of source network address A1 and destination network address A2 has a corresponding reverse packet flow identified by the combination of source network address A2 and destination network address A1, where the values of A1 and A2 are mirrored for the symmetric source and destination network address fields. In some cases, the virtual router first determines a forwarding policy for the reverse packet flow according to slow-path processing and associates the reverse packet flow with the forwarding policy for the reverse packet flow. The proactive flow table techniques described above may permit the virtual router to avoid initial slow-path processing for an initial packet of a flow that matches the proactively-added flow table entry for a reverse flow, thereby reducing latency for the initial packet and potentially improving the overall bandwidth of the server In one example, a method includes receiving, by a virtual router of a computing device for one or more virtual networks, a plurality of inbound tunnel packets from a physical network. The method also includes determining, by the virtual router, whether the inbound tunnel packets include a same virtual network identifier that identifies a virtual network of the virtual networks. The method also includes in response to determining the inbound tunnel packets include the same virtual network identifier, and without separately routing the inbound tunnel packets, aggregating the inbound tunnel packets to generate an aggregate tunnel packet having a single instance of the same virtual network identifier. The method also includes routing, by the virtual router, the aggregate tunnel packet to a host associated with the identified virtual network as if the aggregate tunnel packet were received from the physical network.

In another example, a network system includes a switch fabric comprising a plurality of switches interconnected to form a physical network. The network system also includes a virtual network controller device configured to configure and manage one or more virtual networks within the physical network. The network system also includes a plurality of servers interconnected by the switch fabric, wherein each of the servers comprises an operating environment executing one or more virtual machines in communication via the one or more virtual networks, and wherein the servers execute at least one virtual router configured to extend the one or more virtual networks to the operating environments of the virtual machines. A virtual router of the at least one virtual router is configured to receive a plurality of inbound tunnel packets from a physical network; determine whether the inbound tunnel packets include a same virtual network identifier that identifies a virtual network of the virtual networks; in response to determining the inbound tunnel packets include the same virtual network identifier, and without separately routing the inbound tunnel packets, aggregate the inbound tunnel packets to generate an aggregate tunnel packet having a single instance of the same virtual network identifier; and routing, by the virtual router, the aggregate tunnel packet to a host associated with the identified virtual network as if the aggregate tunnel packet were received from the physical network.

In another example, a non-transitory computer-readable medium comprises instructions for causing one or more programmable processors to receive, by a virtual router of a computing device for one or more virtual networks, a plurality of inbound tunnel packets from a physical network; determine, by the virtual router, whether the inbound tunnel packets include a same virtual network identifier that identifies a virtual network of the virtual networks; in response to determining the inbound tunnel packets include the same virtual network identifier, and without separately routing the inbound tunnel packets, aggregate the inbound tunnel packets to generate an aggregate tunnel packet having a single instance of the same virtual network identifier; and route, by the virtual router, the aggregate tunnel packet to a host associated with the identified virtual network as if the aggregate tunnel packet were received from the physical network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
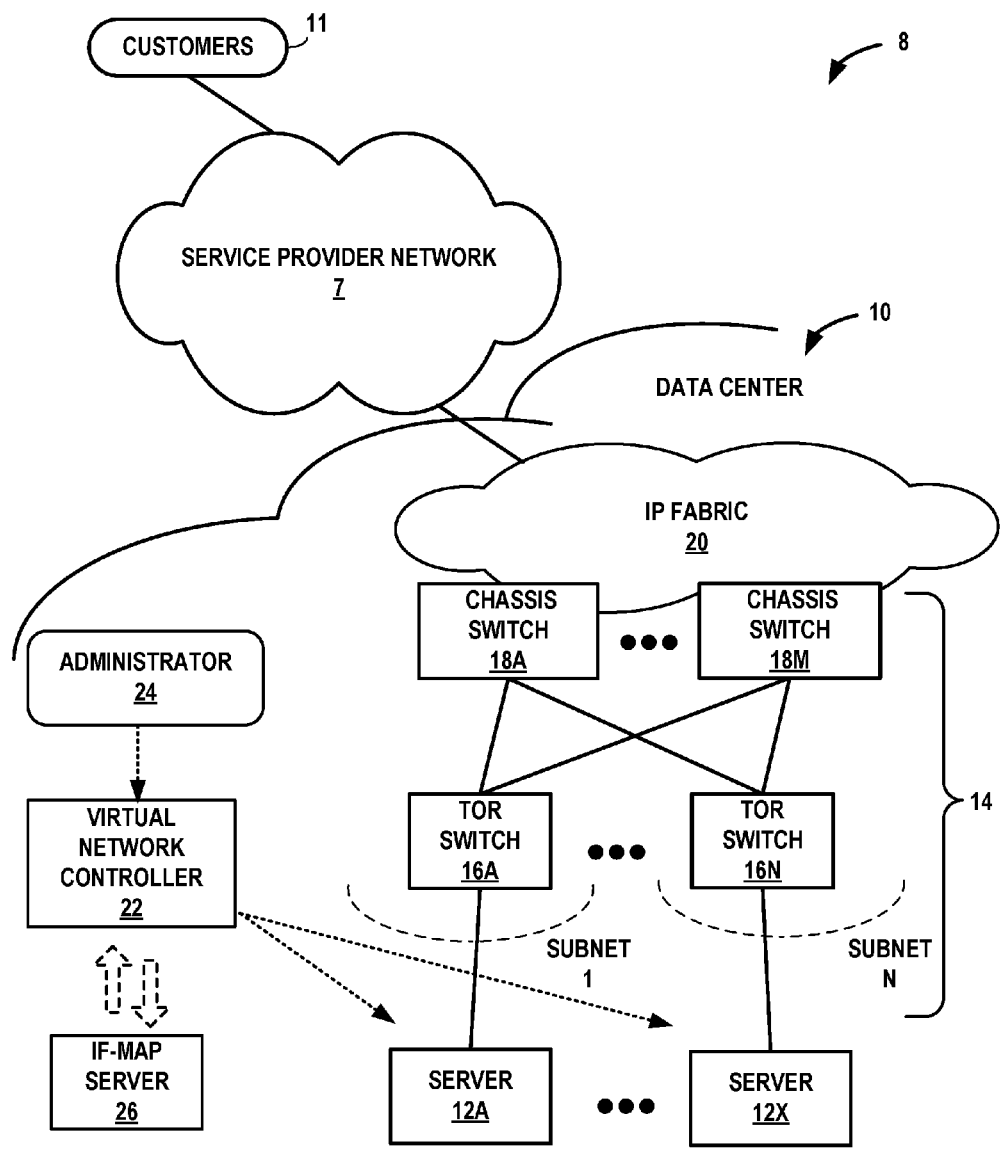
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In accordance with various aspects of the techniques described in this disclosure, one or more of servers 12 may include a virtual router that executes multiple routing instances for corresponding virtual networks within data center 10. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. In some examples, the virtual router aggregates multiple packets according to matching criteria that includes the virtual network identifier of the outer header as well as one or more fields of the inner header. That is, a virtual router executing on one of servers 12 may receive inbound tunnel packets of a packet flow from switches 16 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets.

As one example, the virtual router may extend a Generic Receive Offload (GRO) routine available by the server kernel and that is specialized for processing layer two (L2) packets, but the virtual router may leverage the GRO routine in a way so as to utilize the routine to manipulate multiple tunneled packets as if they were L2 packets, thereby efficiently constructing the aggregate tunnel packet. In some examples, the virtual router provides multiple tunneled packets to GRO for aggregation by, at least in part, setting the respective virtual network identifiers and invoking the GRO routine as if the virtual network identifiers are a L2 header for the inner packets of the tunneled packets. In this way, the GRO routine considers each packet received from the virtual router for aggregation purposes as a non-tunneled, L2 packet that includes at least a portion of an L2 header (e.g., a destination MAC address) set to the virtual network identifier for a received tunneled packet and a layer 3 ("network") packet that corresponds to the inner packet for the received tunnel packet. By matching according to the L2 ("data link") header and one or more header fields of the layer 3 packet, the GRO routine may aggregate multiple such packets into an aggregated packet for delivery to the appropriate routing instance. In this way, the aggregation techniques may increase the virtual router bandwidth by reducing the number of packet headers for processing.

In some example implementations, the virtual routers executing on servers 12 may steer received inbound tunnel packets among multiple processor cores to facilitate packet processing load balancing among the cores when processing the packets for routing to one or more virtual and/or physical machines. As one example, server 12A may include multiple network interface cards and multiple processor cores to execute the virtual router and may steer received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In other example implementations, the virtual routers executing on servers 12 may proactively add, by the virtual router, flow table entries to identify reverse flows of flows processed by a routing instance of the virtual router. In an example implementation, the virtual router of server 12A may proactively add flow table entries to identify reverse flows of flows processed by a routing instance of the virtual router. For example, a virtual machine executing on server 12A and a member of a virtual network implemented by data center 10 may receive an initial inbound tunnel packet for a packet flow originated by virtual machine executing on server 12X and also a member of the virtual network. Upon receiving the initial inbound tunnel packet, in addition to adding a flow table entry specifically for the inbound packet flow, the virtual router of server 12A may also proactively add a flow table entry specifically for the reverse packet flow (i.e., an outbound packet flow) that corresponds to the received inbound packet flow. In this way, server 12A may predict the need to process outbound tunnel packets having reverse flow criteria and, as a result, more efficiently look up and use the flow table entry for the reverse packet flow to process subsequent packets that belong to the reverse packet flow.

Figure 2:
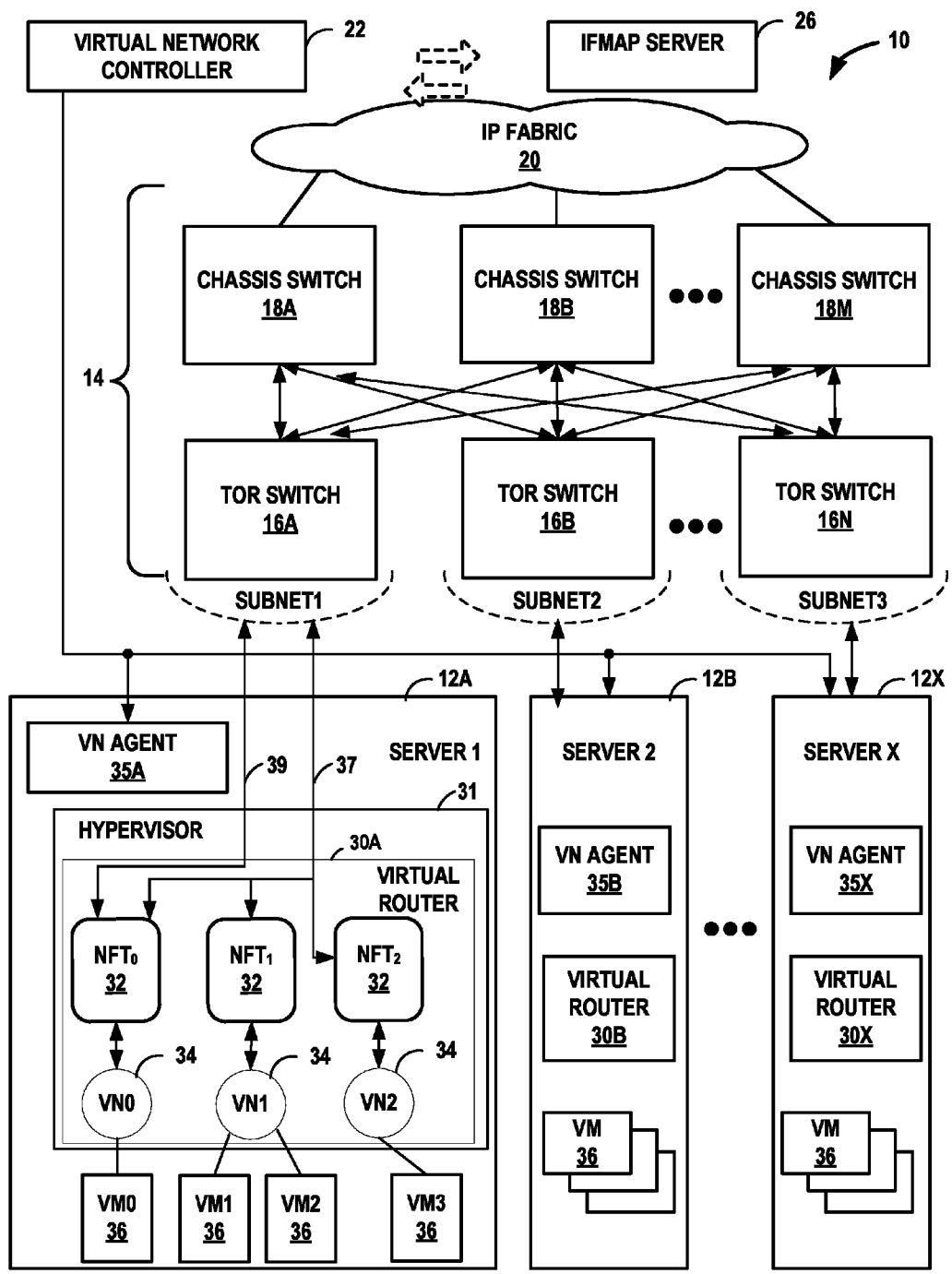
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12 or a separate computing device that hosts a customer application may alternatively referred to as "hosts."

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIGS. 2A and 2B.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet 41, an "inner packet," virtual router 30A by an internal link. Virtual router 30A uses $NFT_1$ to look up a virtual network destination network address for packet 41. $NFT_1$ specifies an outbound interface for virtual router 30A and encapsulation for packet 41. Virtual router 30A applies the encapsulation to add a tunnel header to generate outer packet 43 and outputs outer packet 43 on the outbound interface, in this case toward TOR switch 16A.

The routing information may, for example, map packet key information (e.g., destination IP information and other select information from packet headers) to one or more specific next hops within the networks provided by virtual routers 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual router 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual routers 30 may communicate using virtual subnet VN0 in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

Figure 3:
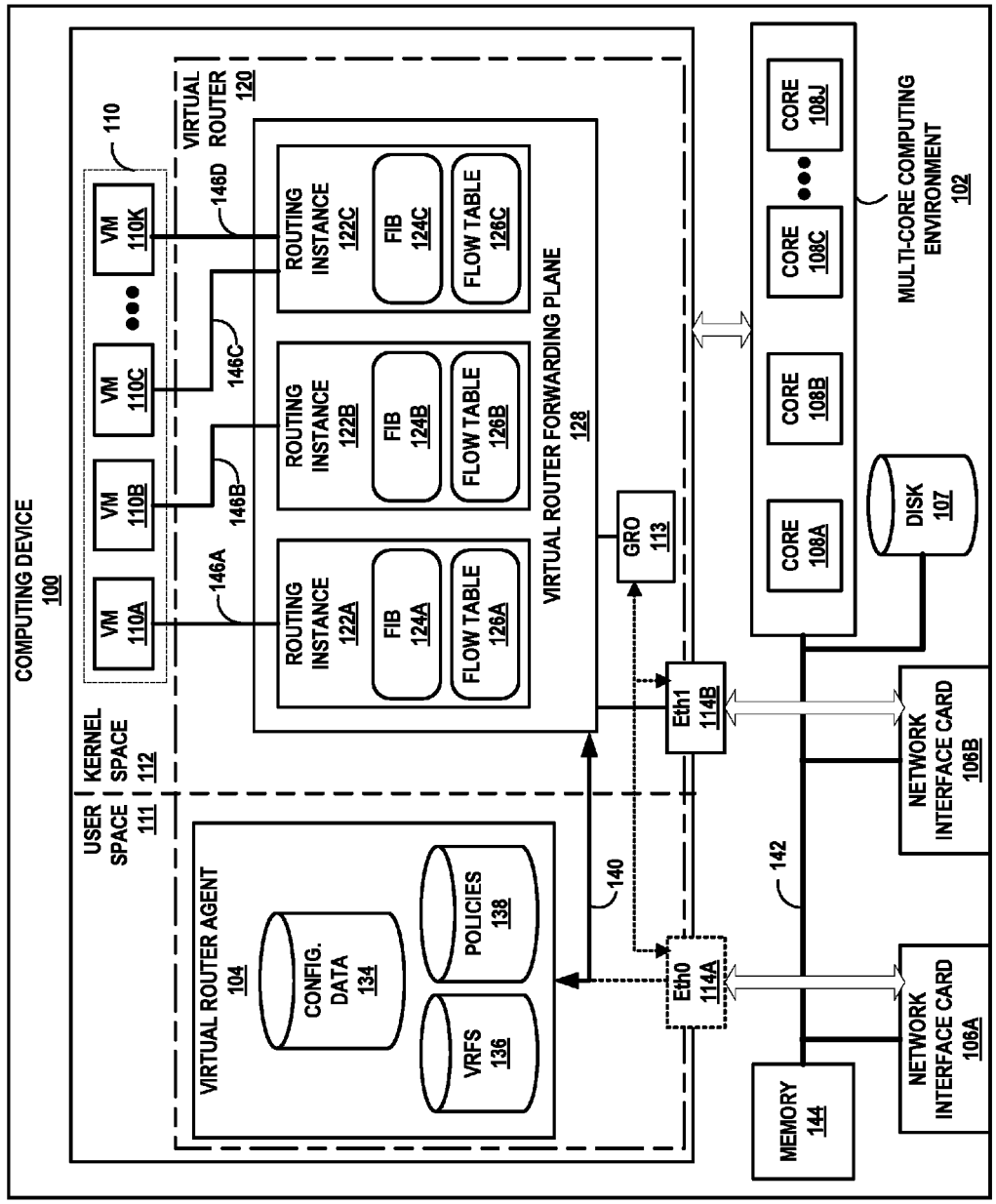
FIG. 3 is a block diagram illustrating a computing device that executes an example virtual router for virtual networks according to techniques described herein.

FIG. 3 is a block diagram illustrating a computing device that executes an example virtual router for virtual networks according to techniques described herein. Computing device 100 may represent any of servers 12 of FIGS. 1-2 or other device, such as any of TOR switches 16.

Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 3) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120. Virtual router agent 104 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request virtual router agent 104 to install a flow table entry in the flow table for the new packet flow. This may be referred to as "slow-path" packet processing for initial packets of packet flows and is represented in FIG. 3 by slow path 140.

In this example, virtual router agent 104 may be a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In some example implementations, virtual router 104 includes a kernel-based offload engine that seamlessly and automatically aggregates multiple incoming packets from a single packet flow. In the example of FIG. 3, computing device 100 includes Generic Receive Offload (GRO) 113 configured to aggregate multiple packets received by NICs 106 from the underlying physical network and to merge the multiple packets to a single packet prior to delivery to virtual router forwarding plane 128. In this illustrated example, GRO 113 is included in kernel space 112 and may be, for example, a Linux kernel routine. GRO 113 may, however, be executed in user space 111 in some examples or within one or more of NICs 106. In addition, GRO 113 may be executed during any step of the packet processing process, including prior to or after delivery to virtual router forwarding plane 128. That is, virtual router forwarding plane 128 may in some examples apply GRO 113 to received packets.

GRO 113 aggregates multiple packets according to matching criteria selected from fields of the inner header and virtual network identifier of the packets. In accordance with techniques described herein, GRO 113 may aggregate multiple received packets according to a combination of virtual network identifier and one or more fields of the inner header, e.g., source and destination network address. To aggregate the multiple received packet having matching criteria, GRO 113 may combine (e.g., concatenate) the respective payloads of the received packets while disregarding (i.e., removing) the virtual network identifiers and inner headers of the packets (i.e., concatenating only the payloads of the inner packets and not, in some instances, the entire inner packets themselves) and add a single instance of at least the virtual network identifier and the inner header to the consolidated payloads to form a complete packet. In some instances, GRO 113 adds only a single instance of the inner header common to the aggregated packets so as to form the complete packet as if the complete packet were received directly by one of network interface cards 106.

In some examples, the interface for GRO 113 is configured to receive layer 2 (L2) packets and GRO 113 aggregates multiple L2 packets that have matching destination L2 addresses (e.g., MAC addresses) and, at least in some cases, also matching one or more L3 packet fields and transport layer (layer 4 or "L4") packet fields. To leverage GRO 113 to aggregate multiple received tunnel packets, Eth1 114B or another other component of computing device 100 may append the virtual network identifiers to the received tunnel packets, modify the received tunnel packets using the virtual network identifiers, or otherwise provide the received tunnel packets to GRO 113 as if the virtual network identifiers were instead at least a part of an L2 header for the received packets. Consequently, GRO 113 may view the multiple, tunnel packets as L2 packets, and GRO 113 can be leveraged to aggregate received packets having a common virtual network identifier and other common L3/L4 fields of the inner packet and return an aggregated packet having the common virtual network identifier as part of an L2 header for the aggregated packet. The virtual network identifiers may include, for example, MPLS labels each associated with a different overlay network.

As a result of the above techniques, virtual router forwarding plane 128 may receive a single aggregated packet to be processed and forwarded by routing instances 122, rather than a series of multiple packets each having separate headers that must be individually processed and forwarded by routing instances 122. This may improve the overall bandwidth of computing device 100 by reducing cores 108 cycles taken for destination lookup, the number of packets passed by the hypervisor (e.g., hypervisor 31 of FIG. 2) to the virtual router 120, and potentially other packet header processing tasks.

In some examples, the GRO 113 interface may conform at least in part to the following example of a GRO routine implemented in the Linux kernel int napi_gro_receive(struct napi_struct *napi, struct sk_buff *skb);

In the above function prototype that defines an example of the GRO 113 interface, skb includes a buffer that stores a packet received by computing device 100. Virtual router 120 invokes the napi_gro_receive function to provide received packets for aggregation into aggregate packets prior to application of the virtual router forwarding plane 128. GRO 113 may store a list of one or more received packets provided to the GRO 113 via the napi_gro_receive function.

In addition to the buffer included in skb, the skb includes pointers to the L2 header and L3 header portions of the packet stored in the buffer. The virtual router 120 may receive via the Eth 114 interfaces via the NICs 106 an inbound packet that includes an L2 (e.g., MAC) header, outer L3 (e.g., IP) header, tunnel header that includes a virtual network identifier, an inner L3 header (these are described more fully below with respect to FIG. 4), and payload. The virtual router 120 may remove (or "strip") the L2 header, outer IP header, and tunnel header of the inbound packet and invoke the GRO 113 with a modified packet that includes the virtual network identifier concatenated with only the inner IP header and payload. In such examples, the skb pointer to the L2 header may point to the virtual network identifier and the skb pointer to the L3 header may point to the inner IP header. The virtual router 120 may define a new napi_struct to define the length of the "L2 header" for the packet provided to the GRO 113 in order to define the interface for GRO 113 in accordance with techniques described herein. In instances in which the virtual network identifier is an MPLS label having a one-to-one mapping to a virtual/overlay network, the "L2 header" of the packet provided to the GRO 113 is the MPLS label. A MPLS label may be a 4-byte value that includes the 20-bit label identifying the virtual/overlay network. Accordingly, the virtual router 120 may define the length of the "L2 header" as 4 bytes, thereby alleviating any need to pad the L2 header of the skb with leading/trailing zeroes.

Figure 4:
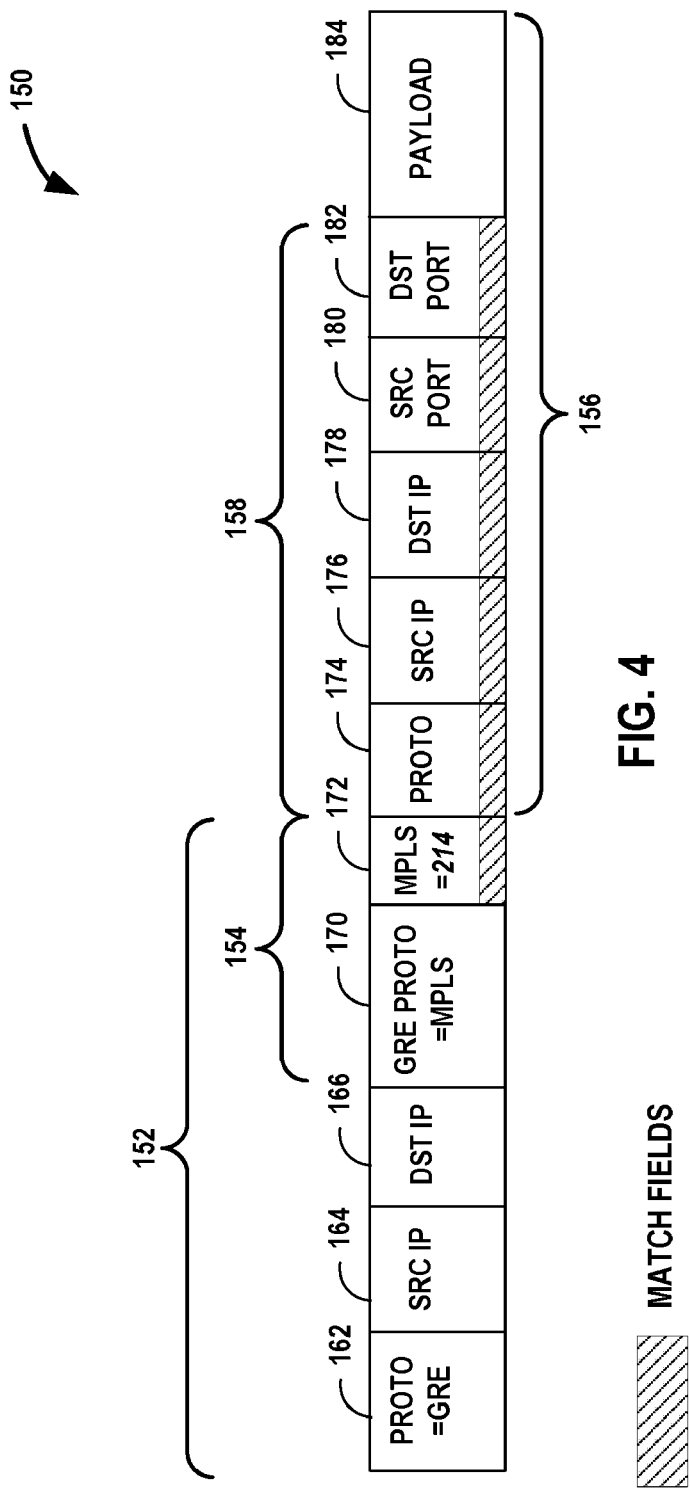
FIG. 4 is a block diagram illustrating, in detail, an example tunnel packet that may be processed by a computing device according to techniques described in this disclosure.

FIG. 4 is a block diagram illustrating, in detail, an example tunnel packet that may be processed by a computing device according to techniques described in this disclosure. For simplicity and ease of illustration, tunnel packet 150 does not illustrate each and every field of a typical tunnel packet but is offered to highlight the techniques described herein. In addition, various implementations may include tunnel packet fields in various orderings. "Outer" or "tunnel" packet 150 includes outer header 152 and inner or "encapsulated" packet 156. Outer header 152 may include protocol or type-of-service (TOS) field 162 and public (i.e., switchable by the underling physical network for a virtual network associated with inner packet 156) IP address information in the form of source IP address field 164 and destination IP address field 166. Protocol field 162 in this example indicates tunnel packet 150 uses GRE tunnel encapsulation, but other forms of tunnel encapsulation may be used in other cases, including IPinIP, NVGRE, VxLAN, and MPLS over MPLS, for instance.

Outer header 152 also includes tunnel encapsulation 154, which in this example includes GRE protocol field 170 to specify the GRE protocol (here, MPLS) and MPLS label field 172 to specify the MPLS label value (here, 214). The MPLS label field is an example of a virtual network identifier and may be associated in a virtual router (e.g., virtual router 120 of computing device 100 of FIG. 3) with a routing instance for a virtual network.

Inner packet 156 includes inner header 158 and payload 184. Inner header 158 may include protocol or type-of-service (TOS) field 174 as well as private (i.e., for a particular virtual routing and forwarding instance) IP address information in the form of source IP address field 176 and destination IP address field 178, along with transport layer information in the form of source port field 180 and destination port field 182. Payload 184 may include application layer (layer 7 (L7)) and in some cases other L4-L7 information produced by or for consumption by a virtual machine for the virtual network. Payload 184 may include and thus alternatively be referred to as an "L4 packet," "UDP packet," or "TCP packet."

In accordance with techniques described in this disclosure, a computing device may perform GRO to aggregate multiple instances of tunnel packet 150 having multiple different payloads 184 to form an aggregate tunnel packet that includes all of the different payloads 184 from the various packets yet has a single instance of inner header 158. In some cases, the aggregate tunnel packet may also include at least the virtual network identifier (in this example, MPLS label field 172) of tunnel encapsulation 154. To identify packets to be aggregated to form an aggregate tunnel packet, the computing device may read certain match fields of the packets that define matching criteria. The match fields may include at least the virtual network identifier. In the illustrated example, the match fields include MPLS label field 172 (a virtual network identifier), protocol field 174, private source IP address field 176, private destination IP address field 178, source port 180, and destination port 182. In other words, the inner header 158 of inner packet 156 along with MPLS field 172. The computing device may aggregate instances of tunnel packet 150 that match on all of the match fields to generate an aggregate tunnel packet.

In some instances, the computing device may generate, or otherwise provide to the GRO routine, L2 headers for inner packet 156 using the virtual network identifier for tunnel packet 150 (e.g., MPLS label field 172). In this way, the GRO routine applied by the computing device may match virtual network identifiers re-characterized as, e.g., destination MAC addresses or other elements of an L2 header, and thus without requiring modification of the GRO routine and interface to separately match packets according to a specific virtual network identifier parameter.

Figure 5:
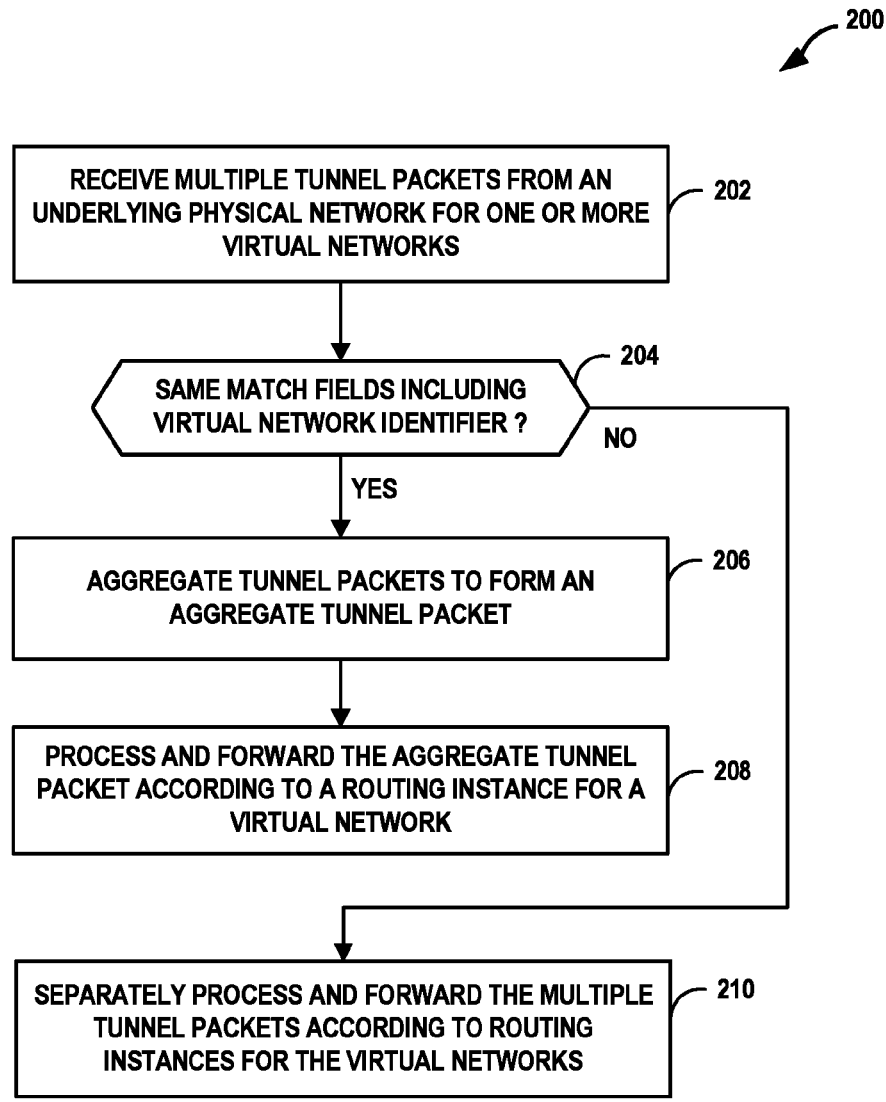
FIG. 5 is a flowchart illustrating an example mode of operation of a computing device for processing tunnel packets, in accordance with techniques described herein.

FIG. 5 is a flowchart illustrating an example mode of operation 200 of a computing device for receiving and processing inbound tunnel packets, in accordance with techniques described herein. The example mode of operation may be described with respect to computing device 100 of FIG. 3 and tunnel packet 150 of FIG. 4. Computing device 100 receives multiple inbound tunnel packets via NICs 106 from an underlying physical network, e.g., IP fabric 20 of a data center 10 of FIG. 1 (202).

If the multiple tunnel packets do not have the same match fields, which include in this example a field that specifies respective virtual network identifiers for the tunnel packets (NO branch of 204), the computing device 100 separately processes and forwards each of the multiple tunnel packets according to one or more routing instances 122 of the computing device 100 (210). If, however, the multiple tunnel packets have the same match fields including the same virtual network identifiers (YES branch of 204), computing device 100 aggregates the tunnel packets to form an aggregate tunnel packet (206). For example, as described herein, computing device 100 may modify each inbound tunnel packet such that the virtual network identifiers conform to or otherwise appear as L2 headers, or computing device 100 may provide each inbound tunnel packet to a kernel-based offload engine (e.g., GRO 113) such that the virtual network identifiers appear as L2 headers to the kernel-based offload engine. Computing device 100 may then invoke the kernel-based offload engine to merge the multiple, inbound tunnel packets into a single, aggregate tunnel packet as if the inbound packets were L2 packets. In some cases, the kernel-based offload engine removes the outer header from the aggregate tunnel packet while leaving the virtual network identifier as part of tunnel header. Computing device 100 may then process and forward the aggregate tunnel packet according to a routing instance 122 for a virtual network without separately processing and forwarding the multiple tunnel packets (208).

Figure 6A:
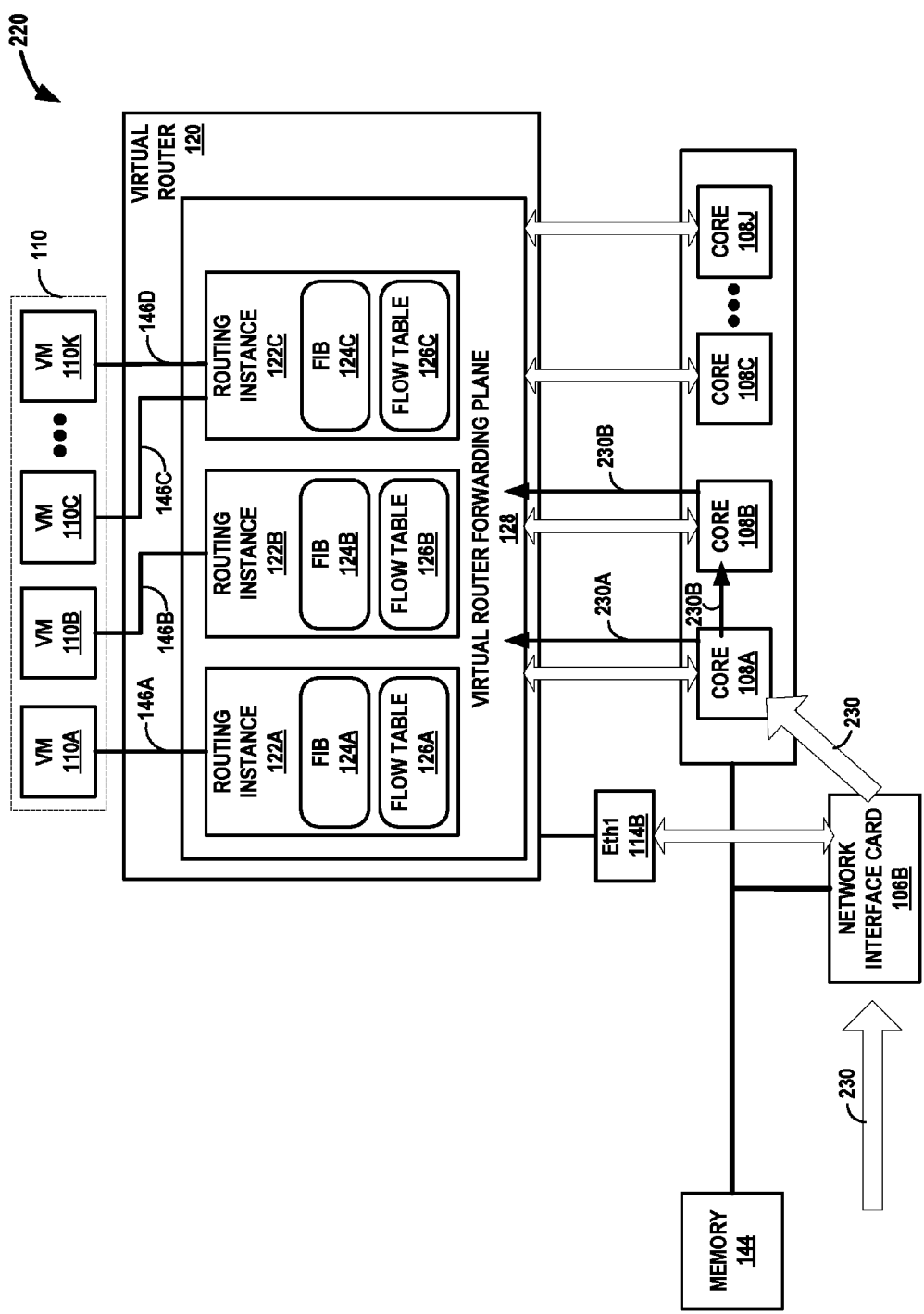
FIGS. 6A-6C are block diagrams each illustrating a computing device that executes an example virtual router for virtual networks according to techniques described herein.
Figure 6B:
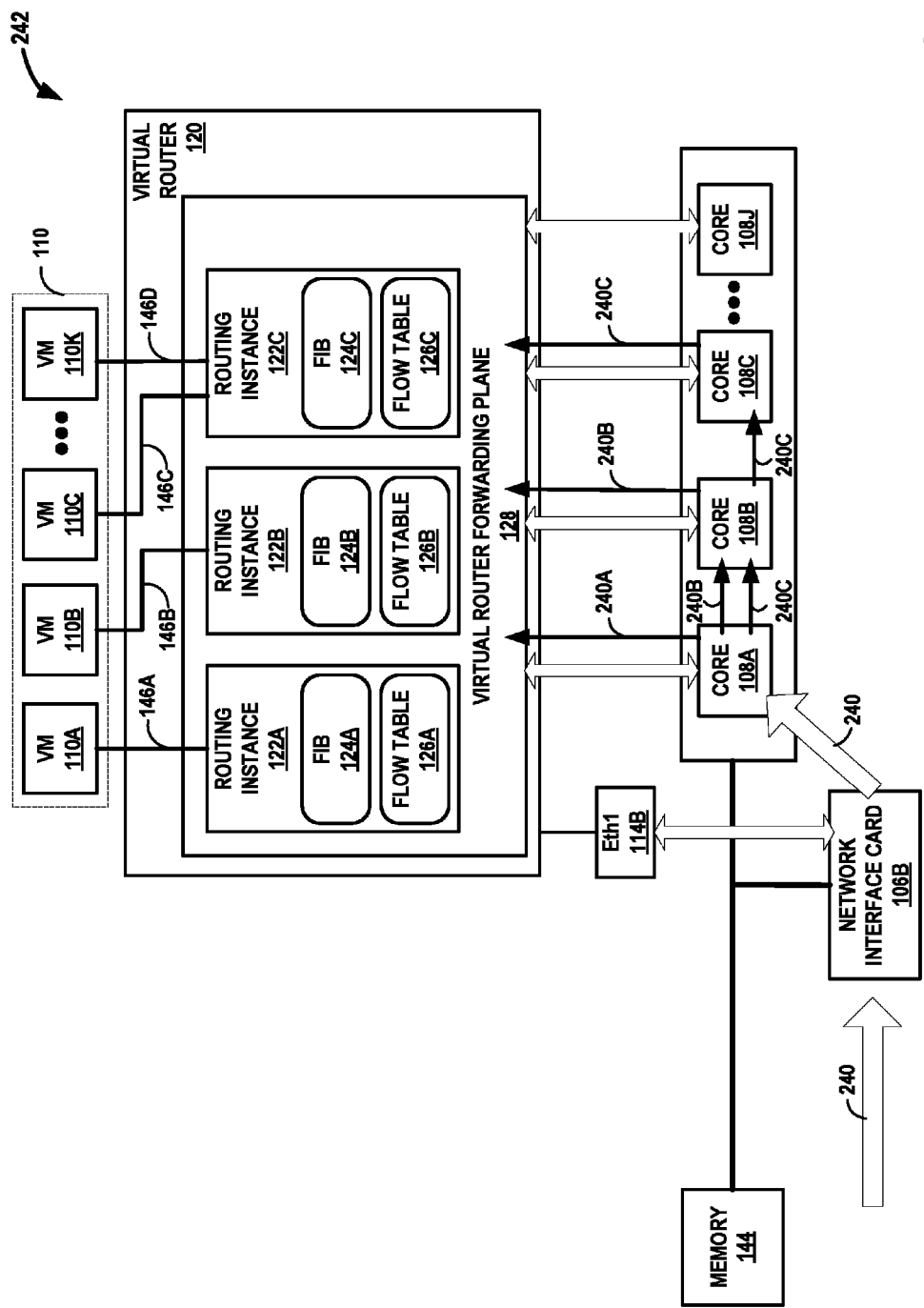
Figure 6C:
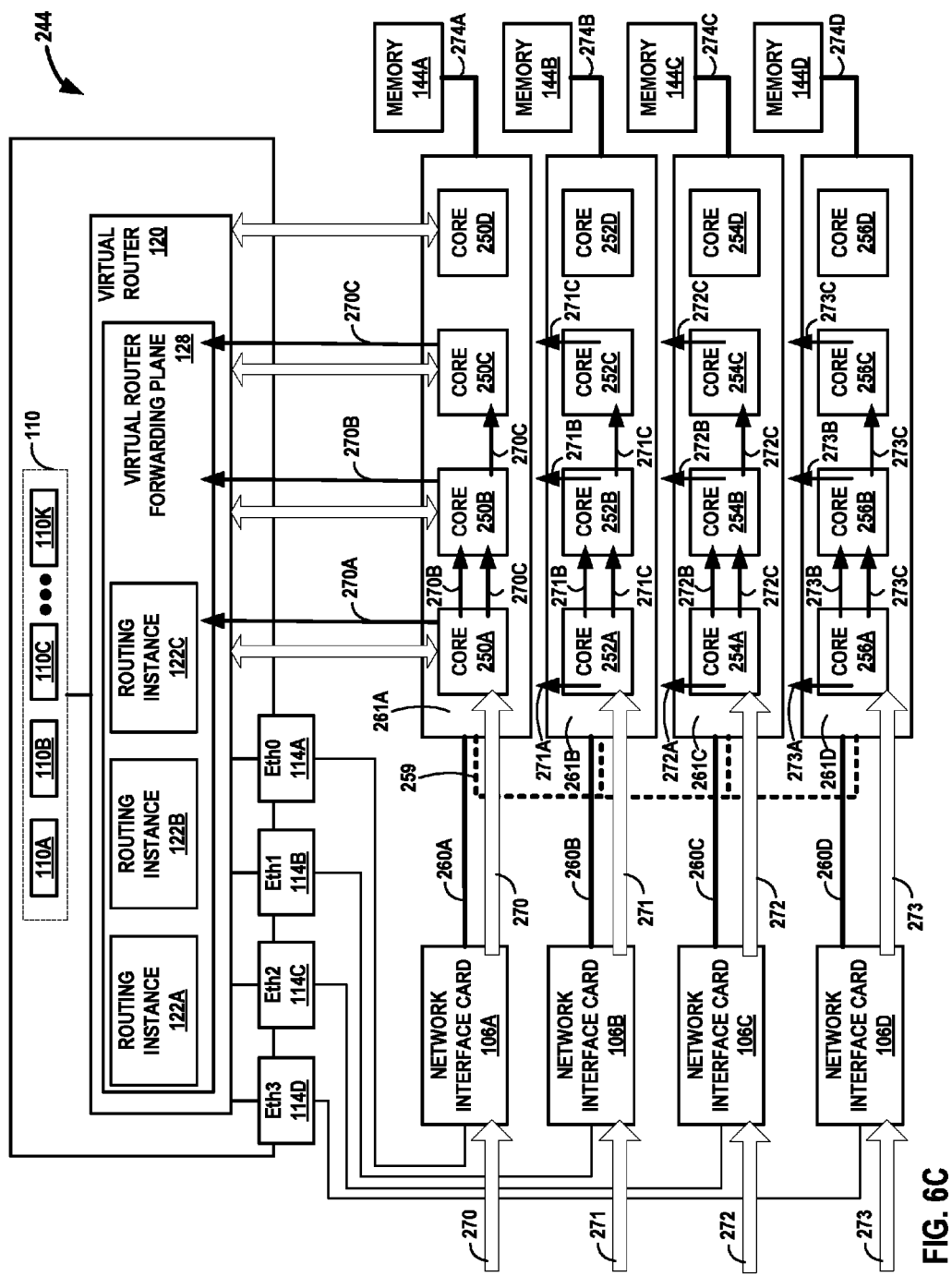

FIGS. 6A-6C are block diagrams each illustrating example components of an example computing device that executes a virtual router for virtual networks according to techniques described herein. Example computing device 220 of FIG. 6A includes network interface card (NIC) 106B that is configured to direct packets received by NIC to processing core 108A for processing. In the illustrated example, NIC 106B receives multiple packet flows 230A-230C (collectively, "packet flows 230") and directs the packet flows 230 to core 108A. Computing device 220 may represent an example of any of servers 12, TOR switches 16, or computing device 100.

In accordance with techniques described in this disclosure, cores 108 are configured to apply receive packet steering to distribute packet processing load of inbound packet flows 230 among multiple cores 108. In other words, rather than processing all inbound packets of packet flows 230 with core 108A, cores 108 steer packets for at least some of the packet to cores 108B-108J for processing.

To apply receive packet steering, cores 108 are configured to apply a hash function to received packets to compute a hash value within a hash function value space defined as the continuous range of possible values that result from applying the hash function to inputs. Hashing function values may alternatively be referred to as "hash indexes" or "hash buckets." Example hash functions include e.g., SHA-1, MD5, or a cyclic redundancy check such as CRC32 or CRC64.

In some examples, cores 108 apply receive packet steering to received packets according to headers of the packets. Because in the context of virtual networks, packets of packet flows 230 may include both an outer header and an inner header, cores 108 may steer a received packet by applying the hash function to header fields of at least one of the inner header and the outer header of the received packet to compute a hash value that is associated with one of cores 108. For example, the hash function applied for receive packet steering may be configured with four buckets (e.g., hash values 0-3) that identify respective processing cores 108A, 108B, 108C and 108J. In some cases, hash buckets may be allocated among processing cores 108 according to available resources of cores 108. For instance, a more powerful processing core 108A may be allocated more hash buckets for the hash function than a comparatively-less powerful processing core 108B. In some cases, hash buckets may be allocated only for cores 108 that are members of the came processing unit (e.g., CPU) as core 108A that is the designated core for NIC 106B. Other processing units having other cores 108 may be designated cores for other NICs 106 of computing device 222.

The one of cores 108 that is associated with a hash value computed for a received packet then processes the packet by executing virtual router 120 to apply a forwarding policy to the packet. In the example illustrated in FIG. 6A, core 108A receives packet flows 230A, 230B from NIC 106B. Core 108A applies receive packet steering to both packet flows 230A, 230B. That is, core 108A applies a hash function to at least one of the inner and outer headers of packets of both packet flows 230A, 230B to determine respective cores 108 with which to process the packets. For example, with respect to packets of packet flow 230A, specifically, core 108A applies the hash function to one or more fields of the outer headers of the packets to determine core 108A with which to apply the virtual router 120 to the packets of packet flow 230A. With respect to packets of packet flow 230B, specifically, core 108A applies the hash function to one or more fields of the outer headers of the packets to determine core 108B with which to apply the virtual router 120 to the packets of packet flow 230B.

In the example of computing device 242 of FIG. 6B, cores 108 are configured to apply an extended form of receive packet steering described with respect to computing device 220 of FIG. 6A. Techniques described above with respect to computing device 220 are similarly applicable to computing device 242. With extended receive packet steering, different cores of cores 108 apply first and second steering operations to the outer and inner headers of packets, respectively. For example, core 108A may be configured to apply a first steering operation with respect to the outer headers of the packets and any of cores 108B-108J may be configured to apply an extended steering operation with respect to the inner headers of the packets. In this way, even the operation of steering packets associated with an overlay network may be efficiently distributed across the cores without the steering operations becoming a bottleneck for processing of inbound tunnel packets associated with the overlay network. As illustrated, NIC 106B receives packet flows 240A-240C (collectively, "packet flows 240") and directs packet flows 240 to core 108 for initial processing. Computing device 242 may represent an example of any of servers 12, TOR switches 16, or computing device 100.

In this example, core 108A applies a first hash function to one or more fields of the outer headers of packets of each of packet flows 240 to determine, for each of the packets, one of cores 108 to apply a second hash to the inner header of the packet. In the case of packet flow 240A, core 108A determines core 108A. In the case of packet flows 240B and 240C, core 108A determines cores 108B and 108C, respectively, and directs the packets accordingly for application of the second hash.

Cores 108 then apply a second hash operation to one or more fields of the inner headers of packets directed from core 108A to determine, for each packet, one of cores 108 with which to apply the virtual router 120. In the case of packet flow 240A, core 108A applies the second hash operation to determine core 108A to apply virtual router 120. Core 108B having received packet flow 240B, 240C as part of the initial receive packet steering operation determines cores 108B and 108C to apply virtual router 120 to packet flows 240B and 240C respectively. Accordingly, core 108B directs packet flow 240C to core 108C for application of virtual router 120. As a result, packet flows 240 may in some cases traverse three separate cores 108 to distribute the load of packet processing among multiple cores of the computing device 242. In addition, applying the hash functions to packet flow 240C (for instance) sequentially by cores 108A, 108B may facilitate processing the packets of packet flow 240C in order.

Example computing device 244 of FIG. 6C illustrates another computing hardware architecture that may be configured to apply packet steering techniques described herein. FIG. 6C illustrates computing device 244 in simplified form for ease of illustration and does not include, e.g., a disk such as disk 107. Computing device 244 may represent an example of any of servers 12, TOR switches 16, or computing device 100, for instance.

In this example, computing device 244 includes sixteen cores, cores 250A-250D, cores 252A-252D, cores 254A-254D, and cores 256A-256D. Each of cores 250, 252, 254, and 256 may be similar to cores 108 of computing device 100 and represents an independent execution unit to perform instructions that conform to an instruction set architecture for the core. Any of the cores as herein may each be implemented as separate integrated circuits (ICs) or may be combined within one or more multi-core processors (or "many-core" processors) that are each implemented using a single IC (i.e., a chip multiprocessor).

Various subsets of cores 250, 252, 254, and 256 may be combined in a multi-core processor to share processor components while each core of the subset maintains at least an independent execution unit to perform instructions substantially independently of the other cores of the subset. For example, cores 250A-250D may share a level 3 (L3) cache and a memory management unit (MMU) for a multi-core processor 261A that includes the cores. However, each of the cores 250A-250D in this example each include a separate execution unit and separate level 1 (L1)/level 2 (L2) caches. Alternatively, the cores 250A-250D may share L2/L3 caches and an MMU of the multi-core processor 261A. Each of multi-core processors 261A-261D may include more or fewer cores.

In the illustrated example, multi-core processors 261A includes cores 250, multi-core processor 261B includes cores 252, multi-core processor 261C includes cores 254, and multi-core processor 261D includes cores 256. In some examples of computing device 244, however, the various cores may be allocated among any one or more multi-core processors or may each be an independent processing unit. Multi-core processors 261A-261D may interconnect by inter-multi-core-communication bus 259, which may for example represent a Quick Path Interconnect (QPI) or other bus by which multi-core processors exchange data and control signals. Multi-core processors 261A-261D are coupled by respective memory busses 274A-274D to respective memories 144A-144D, which constitute working memories for the multi-core processors. Memories 144A-144D may each be similar to memory 144 of computing device 100.

Computing device 244 also includes multiple network interface cards 106A-106D that may each be similar to any of NICs 106 of computing device 100. NICs 106A-106D communicatively couple to cores 250, 252, 254, and 256 via respective I/O busses 260A-260D. For example, NIC 106C communicatively couples to cores 254 via I/O bus 260C. I/O busses may represent PCI, PCIe/PCI-E, PCI-X, HyperTransport, Infiniband, I2C, or other types of I/O busses operative to communicatively couple a NIC to one or more processing cores and/or memories. Each of busses 260A-260D may represent a channel for one or more shared physical busses for the busses 260A-260D. Other example instances of computing device 244 may include more/fewer cores, NICs, memories, etc. Memories 144, network interface cards (NICs) 106A-106B (collectively, "NICs 106"), and cores 250, 252, 254, 256 provide an operating environment for a software stack that executes a virtual router 120 and one or more virtual machines 110A-110K (collectively, "virtual machines 110").

NICs 106A-106D receive respective inbound packet flows 270, 271, 272, 273. That is, NIC 106A receives one or more inbound packet flows 270, NIC 106B receives one or more inbound packet flows 271, and so forth. In accordance with techniques described herein, each of NICs 106A-106D of FIG. 6C is allocated to one of cores 250, cores 252, cores 254, or cores 256 for steering to and processing the sets of inbound packet flows 270, 271, 272, 273 received by the NICs. For example, NIC 106A is allocated to and steers inbound packet flows 270 to cores 250A-250D, which process the inbound packet flows 270 according to the receive packet steering (RPS) and extended RPS techniques described herein.

Each of NICs 106A-106D is also configured with a designated core of one of its allocated cores of FIG. 6C to initially process packets of the inbound packet flows. For instance, NIC 106A may be associated with designated core 250A of cores 250 allocated for processing inbound packet flows received by NIC 106A, i.e., inbound packet flows 270. Likewise, NIC 106C may be associated with designated core 254A of cores 254 allocated for processing inbound packet flows received by NIC 106C, i.e., inbound packet flows 272. Each of the sets of cores 250, 252, 254, 256 may then process the respective sets of inbound packets flows 270, 271, 272, 273 similarly to cores 108, as described above with respect to FIGS. 6A-6B.

For example, NIC 106A may direct one or more inbound packet flows 272 to designated core 254A for processing. Core 254A may apply receive packet steering to packet flows 272 in a manner similar to the application by core 108A to packet flows 230, 240, as described in FIGS. 6A-6B. That is, designated core 254A may perform a first steering association with respect to each of packet flows 270A-270C and, in some examples, the cores 254 to which core 254A steers packet flows 270A-270C may apply virtual router 120 to process/forward the packets of the packet flows (RPS) or perform a secondary steering operation to further distribute the application of virtual router 120 (extended RPS). In this manner, computing device 244 may process significant numbers of packet flows received at multiple NICs 106A-106D using multiple distinct sets of processing cores.

Figure 7:
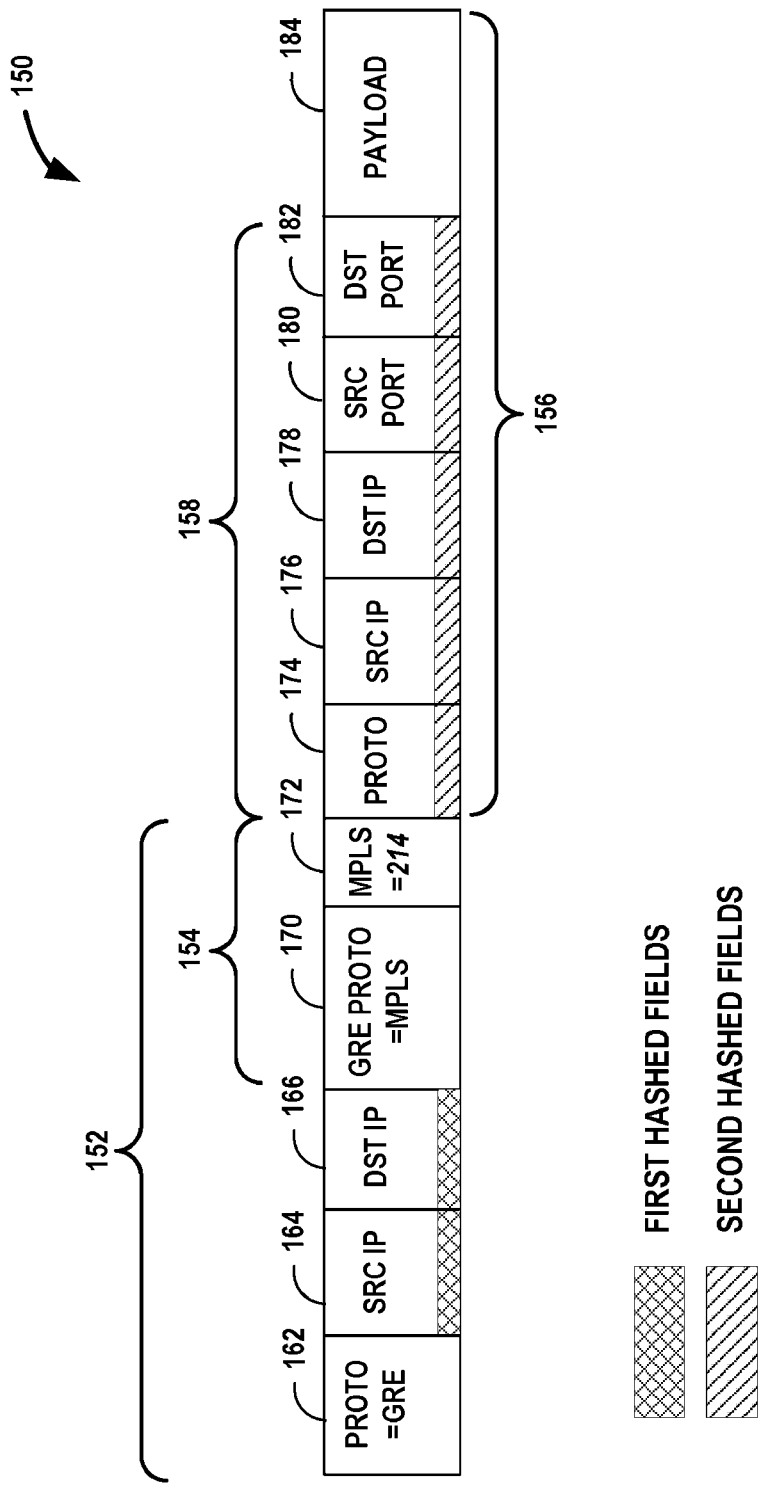
FIG. 7 is a block diagram illustrating the tunnel packet of FIG. 4 and annotated to indicate example fields of the outer and inner header for receive packet steering according to techniques described herein.

FIG. 7 is a block diagram illustrating the tunnel packet format of FIG. 4 and annotated to indicate example fields of the outer and inner header for first and second hash operations for receive packet steering according to techniques described herein. In this example, a first one of cores 108 of computing device 242 is configured to apply a first hash function to fields 164, 166 of outer header 152 and a second one of cores 108 is selected, based on the first hash, to apply a second hash function to fields 174, 176, 178, 180, and 182 of inner header 158.

Figure 8:
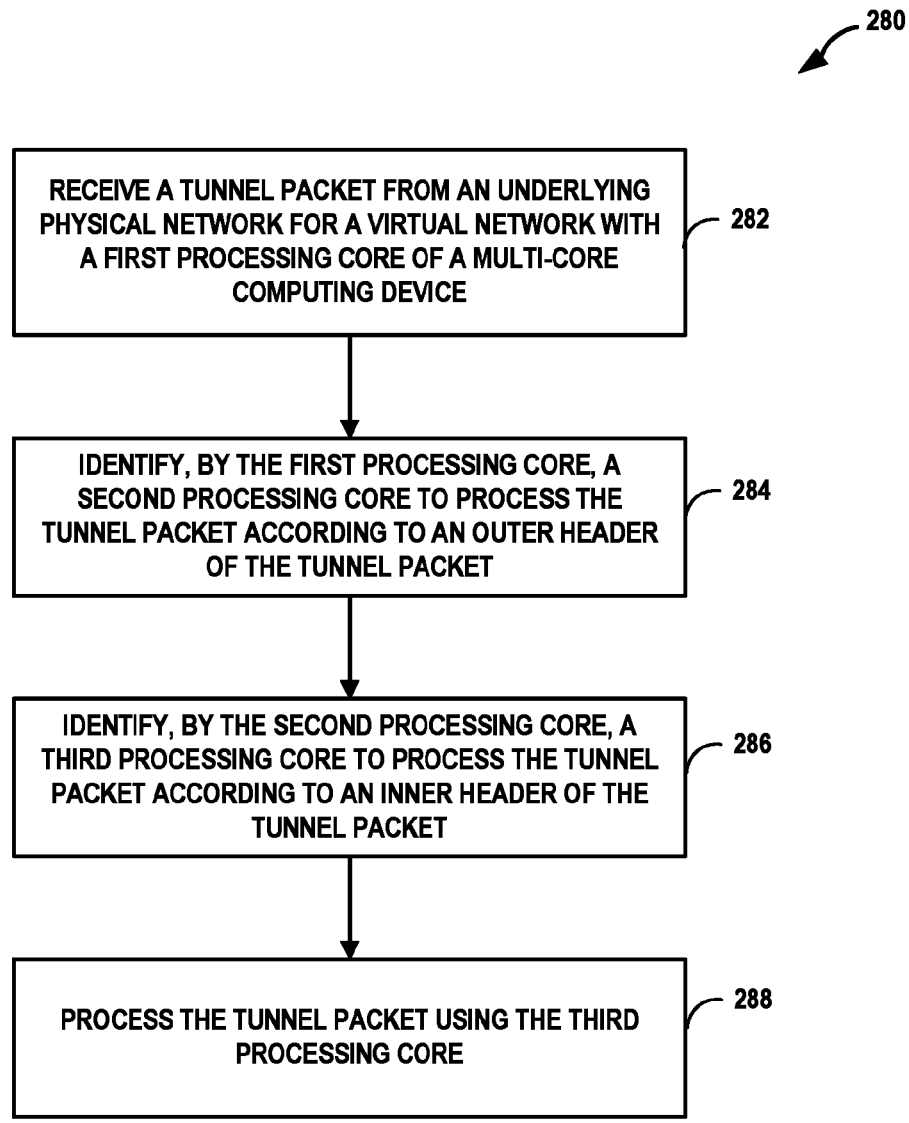
FIG. 8 is a flowchart illustrating example operation of a computing device to distribute packet flow processing among multiple processing cores using receive packet steering, in accordance with techniques described herein.

FIG. 8 is a flowchart illustrating example operation 280 of a computing device to distribute packet flow processing among multiple processing cores using receive packet steering, in accordance with techniques described herein. Example operation 280 is described with respect to computing device 242 of FIG. 6B for illustrative purposes.

Core 108A of multi-core computing environment 102 receives, from an underlying physical network for a virtual network corresponding to one of routing instances 122, a tunnel packet having an inner header for an inner packet and an outer header for the tunnel packet for physical network switching (282). Based at least on the outer header for the tunnel packet, core 108A identifies core 108B with which to process the tunnel packet (284). Core 108A may apply a hash function to the outer header to identify core 108B. Based at least on the inner header for the tunnel packet, core 108B identifies core 108C with which to process the tunnel packet (286). Core 108B may apply a hash function to the inner header to identify core 108C. The packet having been distributed to core 108C using receive packet steering, core 108C applies virtual router 120 to the packet to process the packet (288). In some examples, packets need not traverse the multiple cores 108 and, instead, pointers or other references to the packets may be communicated between the cores 108.

Figure 9:
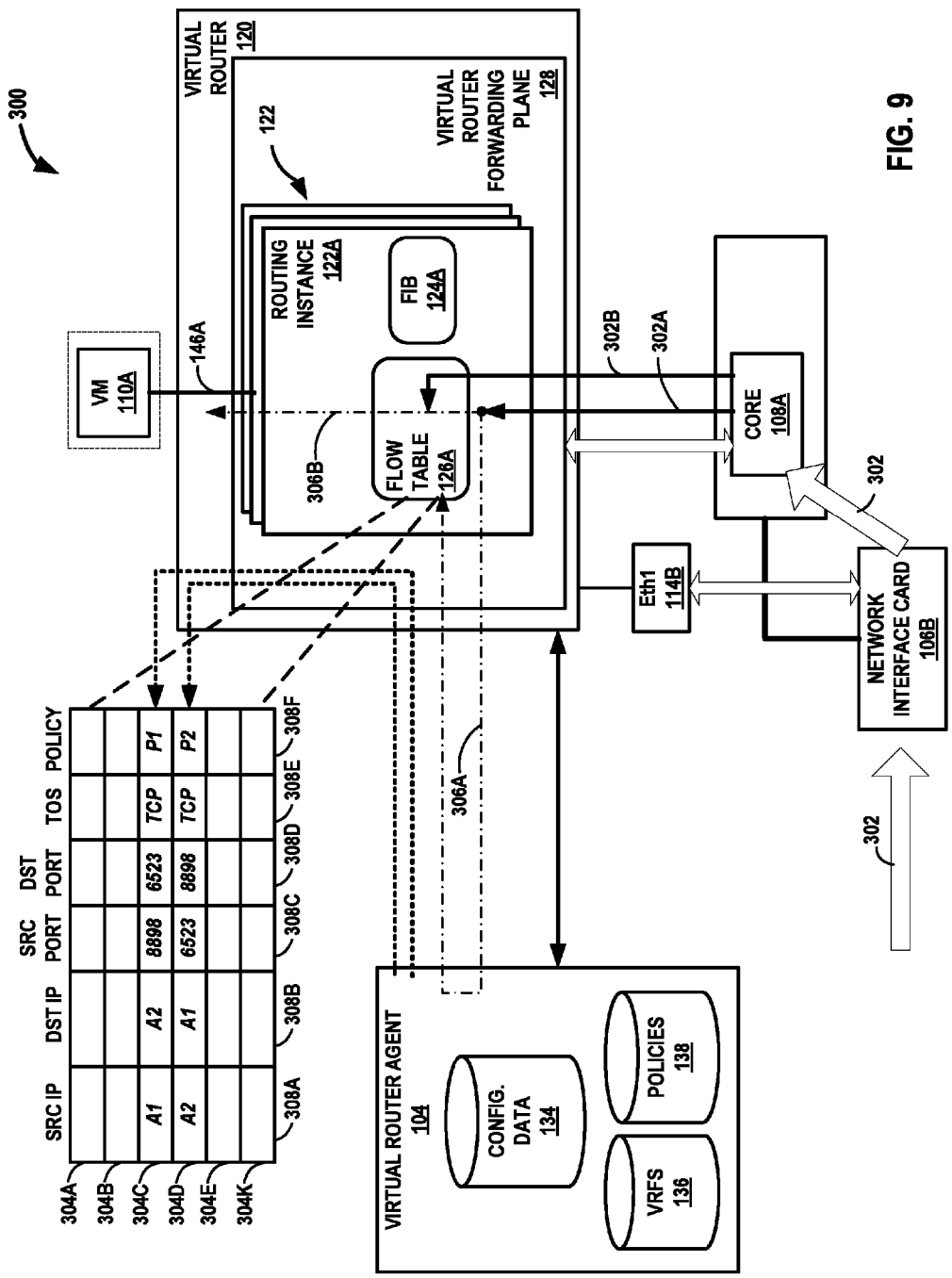
FIG. 9 is a block diagram illustrating example components of an example computing device that executes a virtual router for virtual networks according to techniques described herein.

FIG. 9 is a block diagram illustrating example components of an example computing device that executes a virtual router for virtual networks according to techniques described herein. Computing device 300 is configured to proactively add flow table entries for a reverse packet flows of packet flows of tunneled packets received by virtual router forwarding plane 128.

Flow table 126A of routing instance 122A identifies packet flows and specifies forwarding or other policies to apply to flows that match any of the flow table entries 304A-304K (collectively, "flow table entries 304"). Flow table entries 304 in this example include matching fields for the 5-tuple with which to map flow, i.e., source IP address ("SRC IP") 308A, destination IP address ("DST IP") 308B, source port ("SRC PORT") 308C, destination port ("DST PORT") 308D, and type of service (TOS) 308E. In addition, each of flow table entries 304 specifies a policy for application to packet flows that match the corresponding matching fields of the flow table entry 304.

Virtual router forwarding plane 128 executed by computing device 300 receives packet flows 302 from NICs 106 for processing and forwarding. Packet flows 302 include packets tunneled for one or more virtual networks. Virtual router forwarding plane 128 processes each tunnel packet to determine a virtual network and select the corresponding routing instance 122 with which to process the tunneled packet according to policies configuration data 134, virtual routing and forwarding instances configurations 136 ("VRFs 136"), and policy table 138 ("policies 138") of virtual router agent 104. Policy table 138 represents a table, database, or other data structure that includes one or more policies that define operations to be applied by virtual router 120 to packet flows that traverse virtual router 120.

Upon receiving a tunneled packet (i.e., an inner packet of a "tunnel packet") that none of flow table entries 304 of flow table 126A match (e.g., an initial packet of a new flow), routing instance 122A processes the tunneled packet according to the virtual router 120 "slow path" 306A, which may be an example of slow path 140. Slow path 306A includes virtual router agent 104, which determines for the tunneled packet one of policies 138 to apply to the tunneled packet and therefore to any additional packets for the flow for the tunneled packet received by virtual router forwarding plane 128 while the flow is active. Virtual router agent 104, upon determining a policy for a flow, installs a flow table entry 304 for the flow to flow table 126A for application by virtual router forwarding plane 128 to subsequent packets that match the flow matching fields of the flow table entry 304, according to virtual router 120 "fast path" 306B. The appropriate policy to apply to a packet being specified by one of flow table entries 304, processing a packet according to fast path 306B may be performed by virtual router forwarding plane 128 without recourse to virtual router agent 104.

In the illustrated example, routing instance 122A receives an initial packet for packet flow 302A and determines whether the initial packet matches any of flow table entries 304. Packet flow 302A is a tunneled flow for a virtual network corresponding to routing instance 122A. Accordingly, the initial packet is an inner packet of a tunnel packet transported by an underlying physical network connected to an interface of NIC 106B. As the initial packet for packet flow 302A, the initial packet does not match any of flow table entries 304 and virtual router 120 processes the packet using virtual router agent 104 according to slow path 306A. Virtual router agent 104 queries at least one of VRFs 136 and policies 138 to determine forwarding policy P1 for the packet flow 302A. Virtual router agent 104 also installs new flow table entry 304C having matching fields 308A-308E that match packet flow 302A and policy field 308F that specifies the policy P1 for packet flow 302A. Virtual router forwarding plane 128 matches subsequent packets of packet flow 302A processed by routing instance 122A to flow table entry 304C and applies the flow actions specified policy P1 to the subsequent packets according to fast path 302B.

In accordance with techniques described herein, and in response to receiving the initial packet of packet flow 302A, virtual router agent 104 additionally, proactively installs new flow table entry 304D having matching fields 308A-308E that match a reverse flow for packet flow 302A, despite not receiving a tunneled packet for the reverse flow (at least since removing any matching flow table entries 304 for the flow). In this case, flow table entries 304 have symmetric field pairs source IP address 308A and destination IP address 308B as well as source port 308C and destination port 308D. Accordingly, e.g., destination IP address 308B of flow table entry 304D for the reverse flow is the source IP address 308A of flow table entry 304C and source IP address 308A of flow table entry 304D for the reverse flow is the destination IP address 308A of flow table entry 304C. Virtual router agent 104 may determine a separate policy, P2, for the reverse flow and specify the policy in policy field 308E for flow table entry 304D matching the reverse flow.

Subsequently, virtual router forwarding plane 128 receives, for processing, packets for a packet flow 302B that is a reverse flow of packet flow 302A. Packet flows 302A, 302B may be, for instance, a bidirectional communication session between applications such as an HTTP session, FTP session, content or media delivery session, and so forth. Virtual router forwarding plane 128 is able to match the initial and any subsequent packets for packet flow 302B according to fast path 306B, without virtual router 120 having to perform processing according to slow path 306A, by matching the packets for packet flow 302B to flow table entry 304D proactively added by virtual router agent 104 on receiving packet flow 302A that is a reverse flow for packet flow 302B.

Figure 10:
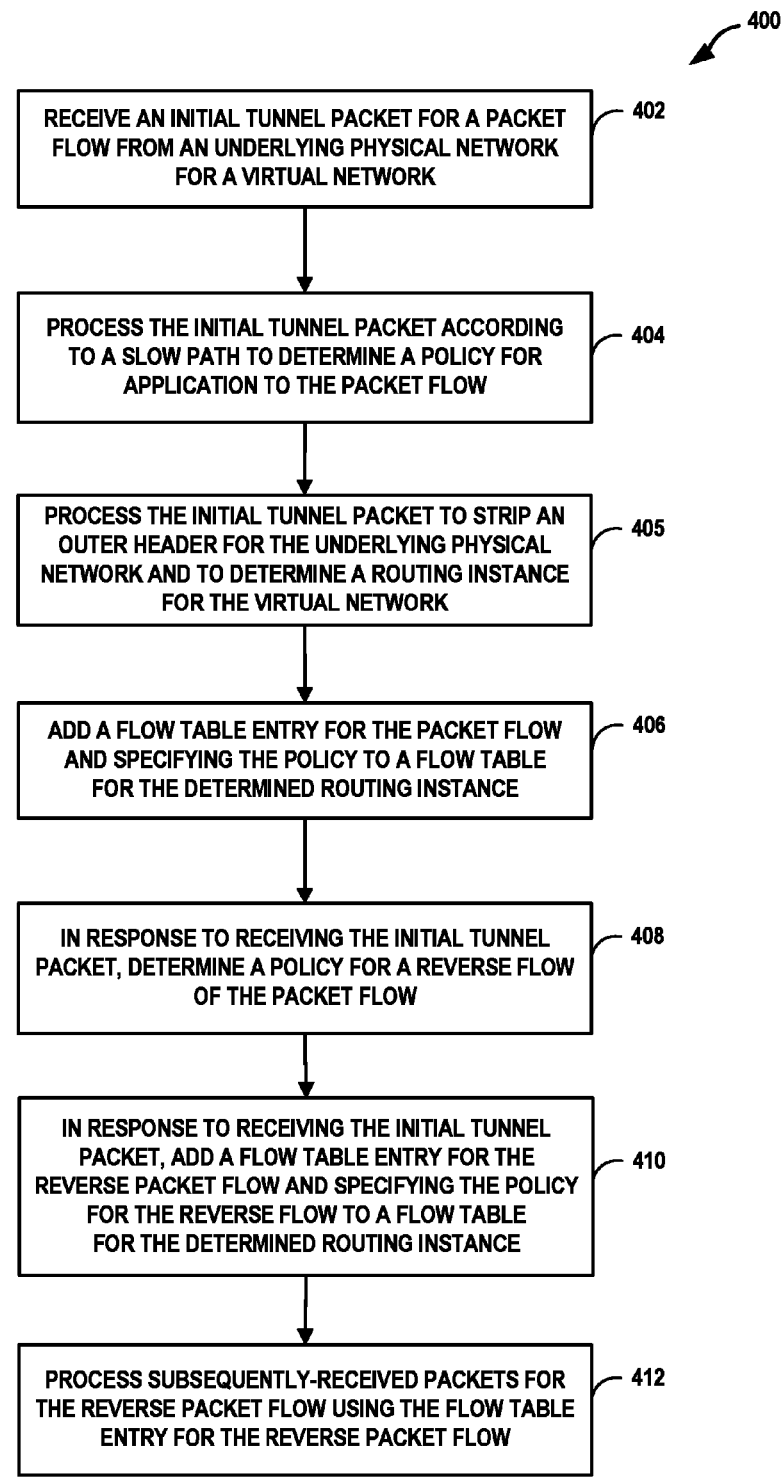
FIG. 10 is a flowchart illustrating example operation of a computing device to distribute packet flow processing among multiple processing cores using receive packet steering, in accordance with techniques described herein.

FIG. 10 is a flowchart illustrating example operation 400 of a computing device to distribute packet flow processing among multiple processing cores using receive packet steering, in accordance with techniques described herein. Example operation 400 is described with respect to computing device 300 of FIG. 9 for illustrative purposes, and the steps of operation 400 may be performed in various orderings.

A virtual router 120 executed by computing device 300 receives an initial tunnel packet for a packet flow from an underlying physical network (402). The initial tunnel packet is associated with a virtual network. The virtual router 120 processes the initial tunnel packet according to slow path 306A using virtual router agent 104, which determines one of policies 138 for application to the packet flow (404). The virtual router 12U additionally processes the initial tunnel packet to identify the associated virtual network and to determine the routing instance 122A of routing instances 122 that corresponds to the identified virtual network. The virtual router 120 may determine the corresponding routing instance using a virtual network identifier of the initial tunnel packet, as described in detail above. For purposes of description only, the corresponding routing instance in this example is routing instance 122A. Virtual router agent 104 adds a flow table entry 304 matching the packet flow to flow table 126A of the determined routing instance 122A and specifying the policy determined for the packet flow (406).

In addition, in response to receiving the initial tunnel packet, virtual router 104 determines a policy for a reverse packet flow of the packet flow (408). Also in response to receiving the initial tunnel packet, virtual router 104 adds, to flow table 126A of the determined routing instance 122A, a flow table entry for the reverse packet flow that specifies the policy for the reverse packet flow of the packet flow (410). Accordingly, virtual router forwarding plane 128 may process any subsequently-received packets for the reverse packet flow using the flow table entry (by fast path 306B) without the reverse packet flow having to undergo processing according to slow path 306A. In this way, the techniques may reduce latency that would otherwise accrue from slow path 306A processing and may improve overall bandwidth of the computing device 300.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
by a computing device, receiving a plurality of inbound tunnel packets that include a common virtual network identifier that identifies a virtual network of one or more virtual networks;
by the computing device, providing, to an aggregation routine, a data structure for each inbound tunnel packet from the inbound tunnel packets, wherein the data structure includes a pointer to a packet and a pointer for a layer 2 header for the packet, wherein the pointer for the layer 2 header in the data structure for the inbound tunnel packet is set to a memory location of the virtual network identifier for the inbound tunnel packet, wherein the aggregation routine uses the data structure for each inbound tunnel packet from the inbound tunnel packets to generate an aggregate tunnel packet comprising a payload that merges payloads of the inbound tunnel packets and a header that includes a single instance of the common virtual network identifier; and
routing, by a virtual router of the computing device, the aggregate tunnel packet to a host executing on the computing device and associated with the identified virtual network.

2. The method of claim 1,
wherein a network interface card of the computing device executes the aggregation routine.

3. The method of claim 1, wherein a network interface card of the computing device executes the virtual router.

4. The method of claim 1, wherein the common virtual network identifier comprises one of a Multiprotocol Label Switching (MPLS) label or VxLAN tag.

5. The method of claim 1, further comprising:
receiving, by the computing device, the inbound tunnel packets from a switch fabric comprising a plurality of switches interconnected to form a physical network that switches packets for the one or more virtual networks, wherein the computing device comprises a server of a plurality of servers interconnected by the switch fabric, wherein each of the servers comprises an operating environment executing one or more virtual machines in communication via the one or more virtual networks, and wherein the servers execute a set of virtual routers that extends the one or more virtual networks to the virtual machines.

6. The method of claim 1, wherein each inbound tunnel packet of the inbound tunnel packets includes an outer header comprising an outer layer three (L3) header and the virtual network identifier and an inner packet comprising an inner L3 header and a payload, and wherein aggregating the inbound tunnel packets to generate the aggregate tunnel packet comprises:

for each inbound tunnel packet of the inbound tunnel packets, removing the outer L3 header to generate a modified tunnel packet that includes the virtual network identifier and the inner packet for the inbound tunnel packet;

determining the modified tunnel packets include the common virtual network identifier;

merging the payloads of the modified tunnel packets to generate a merged payload; and generating the aggregate tunnel packet to include the virtual network identifier of the inbound tunnel packets, the inner L3 header of the inbound tunnel packets, and the merged payload.

7. The method of claim 1, wherein each inbound tunnel packet of the inbound tunnel packets includes an outer header comprising the virtual network identifier and an inner packet comprising an inner header and a payload, and wherein the header comprises at least one field value common to all of the inner headers of the inbound tunnel packets.

8. The method of claim 1, wherein routing the aggregate tunnel packet comprises applying a routing instance associated with the identified virtual network to route the aggregate tunnel packet to the host based at least on the virtual network identifier.

9. The method of claim 1, wherein routing the aggregate tunnel packet to the host comprises routing the aggregate tunnel packet to a virtual machine operating within a virtual environment provided by the computing device on which the virtual router executes.

10. A method comprising:

executing, by a computing device, an aggregation routine that, when provided with a plurality of layer 2 packets that each have a common layer 2 destination address, aggregates the layer 2 packets to generate an aggregate layer 2 packet with the common layer 2 destination address;

receiving, by the aggregation routine, a data structure for each inbound tunnel packet from a plurality of inbound tunnel packets, wherein the data structure includes a pointer to a packet and a pointer for a layer 2 header for the packet, wherein the pointer for the layer 2 header for the inbound tunnel packet is set to a memory location of the virtual network identifier for the inbound tunnel packet;

aggregating, by the aggregation routine, the plurality of inbound tunnel packets, each of the inbound tunnel packets including a common virtual network identifier that identifies a virtual network of one or more virtual networks, to generate an aggregate tunnel packet comprising a payload that merges payloads of the inbound tunnel packets and comprising a header that includes the common virtual network identifier; and routing, by a virtual router of the computing device, the aggregate tunnel packet to a host executing on the computing device and associated with the identified virtual network.

11. The method of claim 10, wherein the aggregation routine comprises a Generic Receive Offload (GRO) routine.

12. The method of claim 10, further comprising:

by the computing device, determining the plurality of inbound tunnel packets include the common virtual network identifier and providing, in response to the determining, the inbound tunnel packets to the aggregation routine.

13. A computing device comprising:

one or more processors operably coupled to at least one memory, wherein the one or more processors are configured to:

receive a plurality of inbound tunnel packets include a common virtual network identifier that identifies a virtual network of one or more virtual networks;

generate, for an aggregation routine, a data structure for each inbound tunnel packet from the inbound tunnel packets, wherein the data structure includes a pointer to a packet and a pointer for a layer 2 header for the packet, wherein the pointer for the layer 2 header in the data structure for the inbound tunnel packet is set to a memory location of the virtual network identifier for the inbound tunnel packet; and execute the aggregation routine to use the data structure for each inbound tunnel packet from the inbound tunnel packets to aggregate the inbound tunnel packets to generate an aggregate tunnel packet comprising a payload that merges payloads of the inbound tunnel packets and a header that includes a single instance of the common virtual network identifier; and execute a virtual router to route the aggregate tunnel packet to a host associated with the identified virtual network.

14. The computing device of claim 13, further comprising:

a network interface card comprising at least one of the one or more processors and configured to execute the aggregation routine.

15. The computing device of claim 13, further comprising:

a network interface card configured to execute the virtual router.

16. A computing device comprising:

one or more processors operably coupled to at least one memory;

a kernel configured for execution by the one or more processors;

an aggregation routine of the kernel, wherein the aggregation routine is configured to, when provided with a plurality of layer 2 packets that each have a common layer 2 destination address, aggregate the layer 2 packets to generate an aggregate layer 2 packet with the common layer 2 destination address, wherein the aggregation routine is configured to receive a data structure for each inbound tunnel packet from a plurality of inbound tunnel packets, wherein the data structure includes a pointer to a packet and a pointer for a layer 2 header for the packet, wherein the pointer for the layer 2 header for the inbound tunnel packet is set to a memory location of the virtual network identifier for the inbound tunnel packet, wherein the aggregation routine is configured to aggregate the plurality of inbound tunnel packets, each of the inbound tunnel packets including a common virtual network identifier that identifies a virtual network of one or more virtual networks, to generate an aggregate tunnel packet comprising a payload that merges payloads of the inbound tunnel packets and comprising a header that includes the common virtual network identifier; and a virtual router configured for execution by the one or more processors to route the aggregate tunnel packet to a host associated with the identified virtual network.

17. The computing device of claim 16, wherein the aggregation routine comprises a Generic Receive Offload (GRO) routine.

18. The computing device of claim 16, wherein the common virtual network identifier comprises one of a Multiprotocol Label Switching (MPLS) label or VxLAN tag.

* * * * *